United States Patent [19]

Peters et al.

[11] Patent Number: 5,076,629
[45] Date of Patent: Dec. 31, 1991

[54] SPARE TIRE STOWAGE ARRANGEMENT

[75] Inventors: Dennis L. Peters, Dearborn Heights; Robert A. Chaney, Rochester Hills, both of Mich.

[73] Assignee: Chrysler Corporation, Highland Park, Mich.

[21] Appl. No.: 627,525

[22] Filed: Dec. 14, 1990

[51] Int. Cl.⁵ .............................................. B62D 43/04
[52] U.S. Cl. ................................ 296/37.2; 224/42.12; 224/42.23
[58] Field of Search ............................ 296/37.2, 37.3; 224/42.12, 42.23, 42.41

[56] References Cited

U.S. PATENT DOCUMENTS 4,976,384 12/1990 Daniels ............................. 224/42.23

Primary Examiner—Margaret A. Focarino
Assistant Examiner—Andrew C. Pike
Attorney, Agent, or Firm—Edward P. Barthel

[57] ABSTRACT

A vehicle spare tire hanger arrangement comprises an elongated carrier member suspended from the vehicle by together with first and second holding rods depending from the vehicle underside for storing either a minimum or a maximum thickness spare tire substantially horizontally therebelow. The carrier member comprises a main tire support portion having first and second connectors adjacent each end thereof with each connector offset a predetermined dimension from one side of the main support portion. The first holding rod lower end is attached to the first end connector by a universal hinge assembly enabling the carrier member, upon release of the second holding rod from the second connector, to be pivoted about a transverse horizontal axis from a horizontal tire stowage position to a downwardly angled tire removal position. The universal hinge assembly enables the operator to rotate the downwardly angled carrier member about its longitudinally extending axis of rotation, which includes the end connectors, between a pair of tire stowage modes. In one mode, the end connectors are oriented below the main support portion such that a minimum thickness tire is adapted to be supported on one side of the main support portion. To attain the other tire stowage mode, the universal hinge assembly is unlocked and the carrier member rotated 180 degrees wherein the end connectors are oriented above the main support portion enabling a maximum thickness tire to be supported on the opposite side thereof.

8 Claims, 5 Drawing Sheets

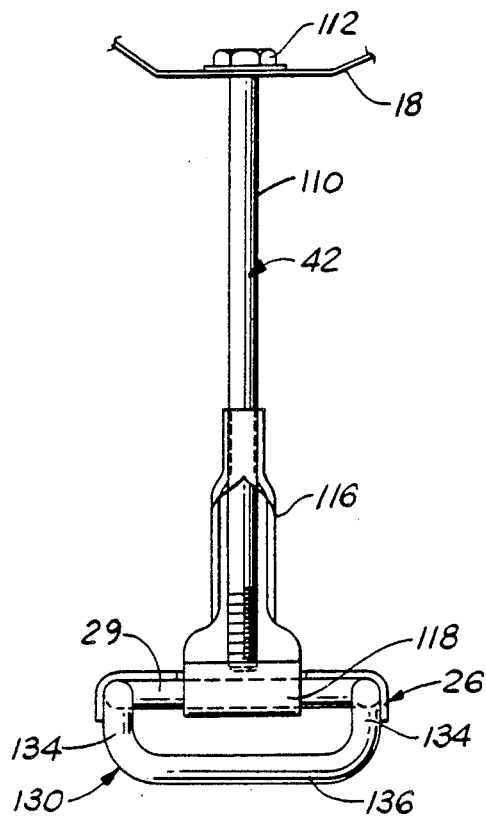
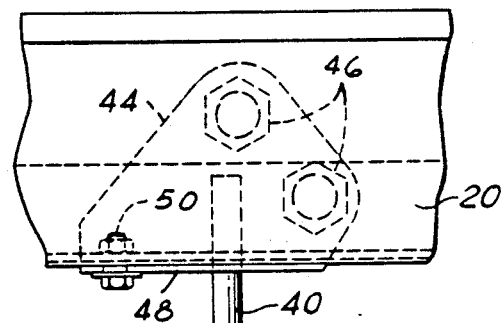
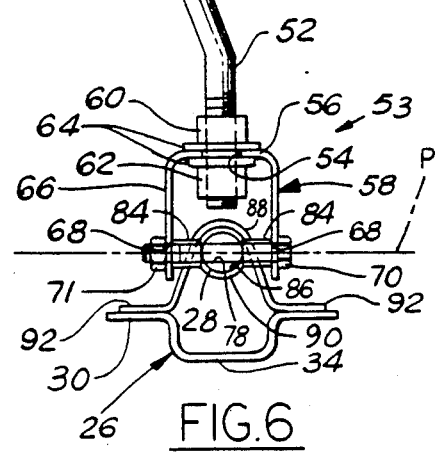
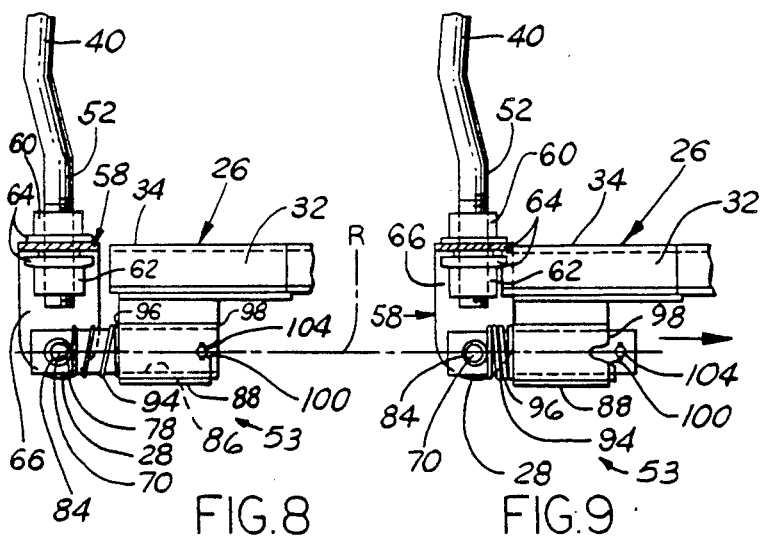
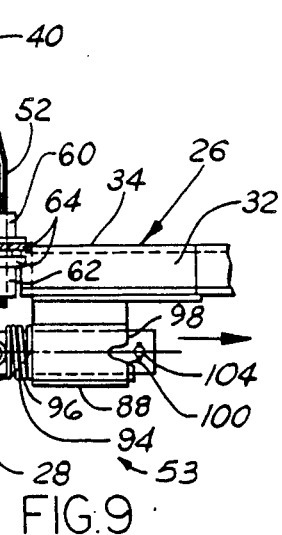
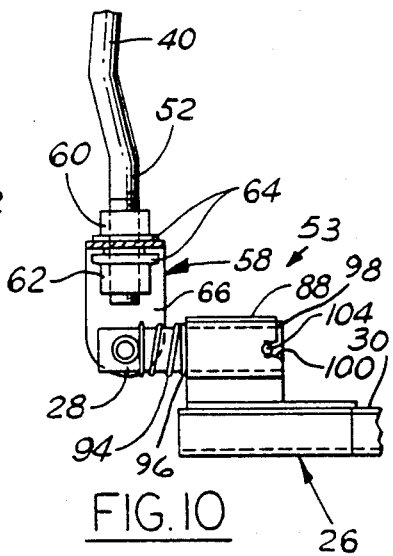

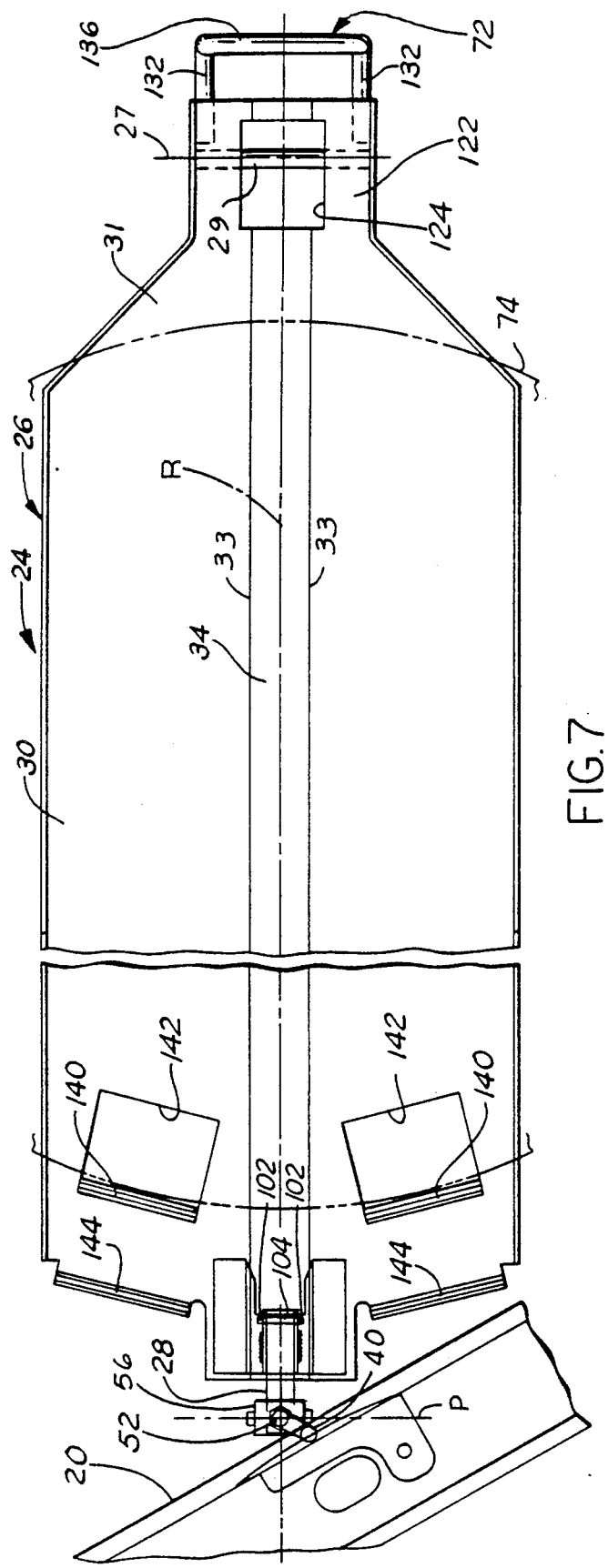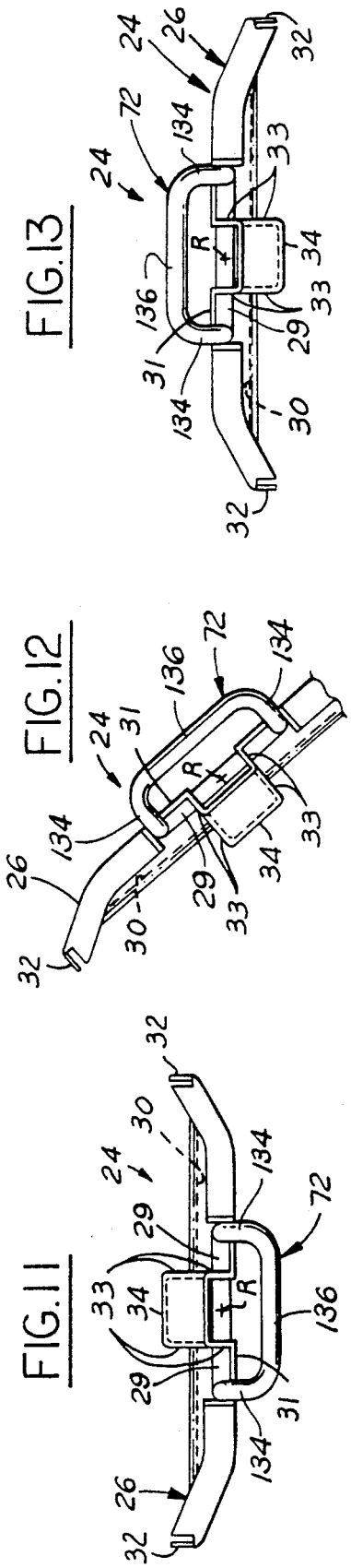

SPARE TIRE STOWAGE ARRANGEMENT

BACKGROUND OF THE INVENTION

This invention relates generally to an arrangement for maintaining a spare tire under the floor pan of a automobile and more particularly to such an arrangement which will stow spare tires of various thickness.

An example of a prior art, vehicle spare wheel carrier is shown in U.S. Pat. No. 4,428,513 issued Jan. 31, 1984 to Delmastro. The '212 patent discloses a spare wheel carrier which includes a spare wheel support member pair of mounting brackets adjacent one end thereof having L-shaped slots. Pivots mounted on the vehicle engage the ends of either legs of the slots to locate the support member different distances from the floor of the vehicle so as to support wheels of different thicknesses.

The U.S. Pat. No. 4,423,900 issued Jan. 3, 1984 to Sugimoto et al. discloses a tire-storage arrangement comprising a tire-storage pan portion forming part of the floor panel structure of the vehicle body and downwardly sunk from the upper face of the floor panel structure. The tire-storage pan portion has a bottom wall and a side wall formed with a concavity which is open upwardly and which is surrounded by the side wall, the tire-storage pan portion internally sized to be suitable for having regular-sized spare tire snugly received on the inner surface of the side wall at least at a plurality of points of the outer perimeter of the tread portion of the tire. A receptacle is externally sized to fit the inner surface of the side wall of the tire storage pan portion, the receptacle member having an upper face located above the upper face of the bottom wall of the tire-storage pan portion at a level equal to the difference between the depth of the concavity in the tire-storage pan portion and the width of a temporary use spare tire. Clamping means are provided for having a temporary-use spare tire securely yet detachable attached to the upper face of the receptacle member.

SUMMARY OF THE INVENTION

It is a feature of the present invention to provide an improved vehicle spare tire stowage apparatus adapted to be supported beneath the floor pan of a vehicle which is readily convertible from a first mode supporting a minimum thickness tire to a second mode supporting a maximum thickness tire.

It is another feature of the present invention to provide an improved vehicle spare tire storage apparatus as set forth above which is economical to make and reliable in operation.

In a preferred embodiment, a spare tire stowage apparatus has an elongated carrier member provided with a main tire support portion and first and second connectors adjacent each longitudinal end of the carrier member. Each first and second connector is offset a predetermined distance from one face of the main tire support portion. The carrier member is suspended from the underside of the vehicle by first and second holding rods depending therefrom. The first holding rod has its lower end attached to the first connector by a universal hinge assembly enabling the carrier member to be moved about a transversely extending horizontally disposed pivot axis between a raised generally horizontal storage position and a lowered generally angular position adapted to be rested on the ground for removal and replacement of the spare tire. The second holding rod is axially adjustable in length and has its lower end releasably attached to the second connector.

Upon an operator releasing the second holding rod from the second connector, the carrier member is pivoted downwardly by the operator to an angled position wherein the universal hinge assembly is unlocked. With the universal hinge assembly unlocked, the operator revolves the carrier member about its longitudinal axis of rotation to a first mode wherein the universal hinge assembly is locked preventing further rotation of the carrier member. With the carrier member locked in its first mode, a minimum thickness tire is installed on the one face of the main support portion. The carrier member is next pivoted to its raised position wherein the first and second connectors are positioned in a horizontal plane spaced below the plane of the tire support portion enabling a minimum thickness tire to be supported on one elevated face of the main support portion.

To convert the spare tire apparatus from its first mode to its second mode, the second holding rod is released from the second connector and the carrier member pivoted downwardly to an angled position wherein the universal hinge assembly is again unlocked. The operator then rotates the carrier member about its longitudinal rotational axis 180 degrees to a second mode and locks the universal hinge assembly allowing a maximum thickness tire to be stowed on the reverse or opposite ace of the main tire support portion. With the carrier member locked in its second mode, the operator pivots the carrier member to its raised position such that the first and second connectors are positioned in a horizontal plane spaced above the plane of the carrier tire support portion.

BRIEF DESCRIPTION OF THE DRAWINGS

The present invention will be better understood by reference to the following detailed description of a preferred embodiment when read in conjunction with the accompanying drawings in which like reference characters refer to like parts throughout the view and in which:

FIG. 5 is an enlarged fragmentary end elevational view, partly in section, of the spare tire carrier releasable holding rod taken in the direction of arrow "5" of FIG. 4;

FIG. 6 is an enlarged fragmentary vertical sectional view taken generally on the line 6—6 of FIG. 4 of the spare tire carrier non-releasable holding rod;

FIG. 7 is a fragmentary horizontal sectional view taken on the line 7—7 of FIG. 4A;

FIG. 8 is a fragmentary side elevational view, partly in section, of the universal joint arrangement in its first mode supporting a minimum thickness spare tire;

FIG. 9 is a view similar to FIG. 8 showing the universal joint arrangement in its unlatched position;

FIG. 10 is a view similar to FIG. 8 showing the universal joint arrangement in its second mode supporting a maximum thickness spare tire;

FIGS. 11 is a fragmentary schematic end elevational view showing the carrier offset handle portion in its first mode supporting a minimum thickness spare tire;

FIG. 12 is a view similar to FIG. 11 showing the carrier offset handle portion partially rotated about its longitudinal axis from its first mode to its second mode; and FIG. 13 is a view similar to FIG. 11 showing the carrier offset handle portion in its second mode supporting a maximum thickness spare tire.

DETAILED DESCRIPTION OF THE INVENTION

Figure 1:
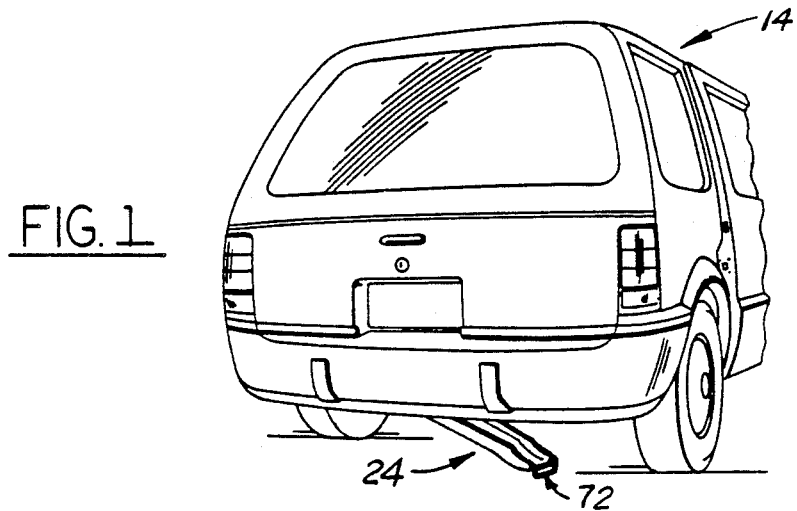
FIG. 1 is a fragmentary perspective view of the rear end portion of an automotive vehicle equipped with a spare tire stowage arrangement according to the present invention.
Figure 2:
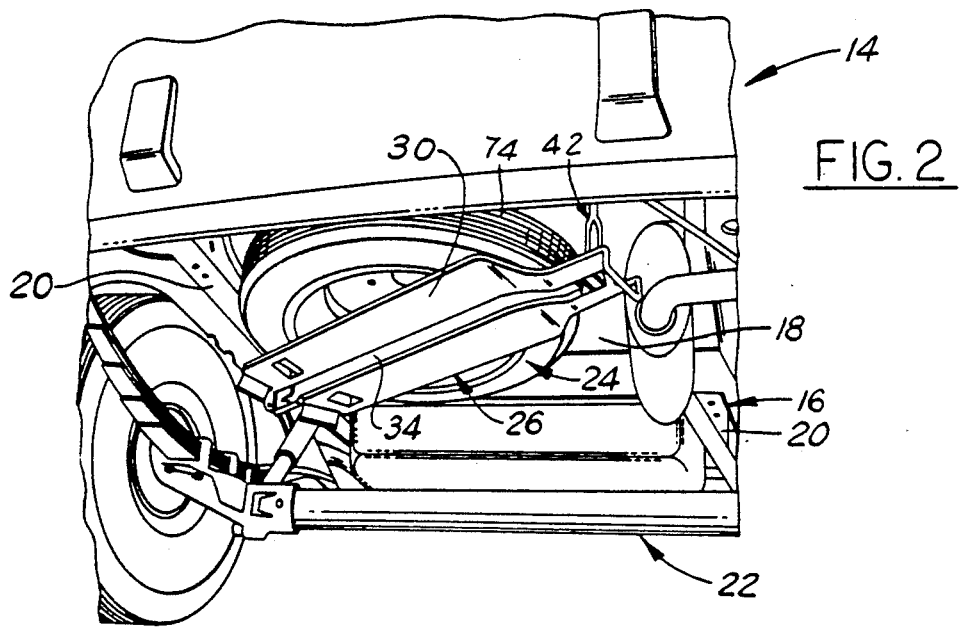
FIG. 2 is a partial view of the vehicle of FIG. 1 looking toward the left rear wheel showing the rear portion of the floor assembly embodying a spare tire carrier according to the present invention, with the carrier being shown in the raised storage position housing a minimum thickness spare tire.

Referring now to the drawings and more particularly to FIG. 1, there is shown a rear end portion of an automotive vehicle having a body 14 supported on a substructure frame partially indicated at 16 in FIG. 2. The substructure frame 16 includes a rear floor panel 18, including a pair of longitudinally extending U-shaped beam members 20 formed therein, and a cross beam rear axle 22.

Figure 3:
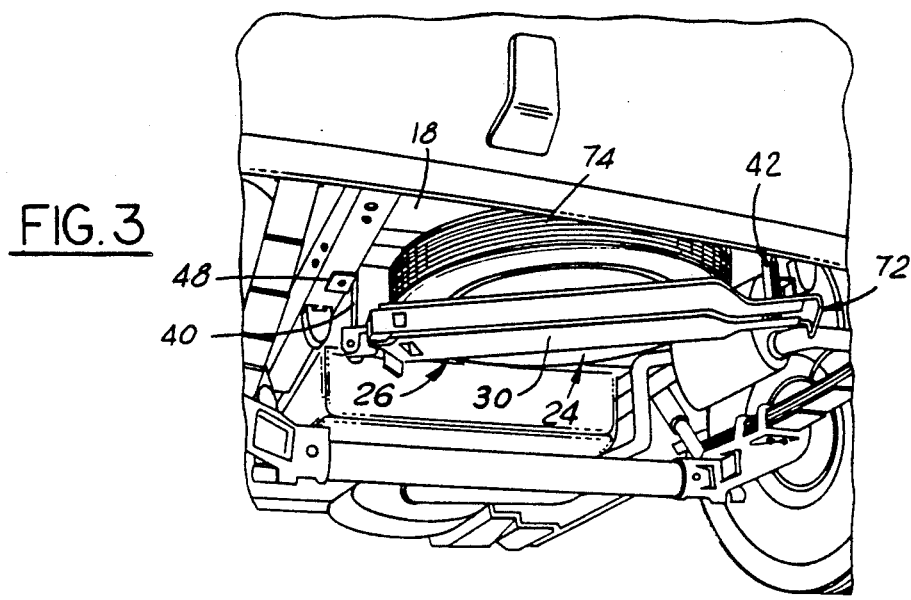
FIG. 3 is a view similar to FIG. 2 looking toward the right rear wheel.
Figure 4:
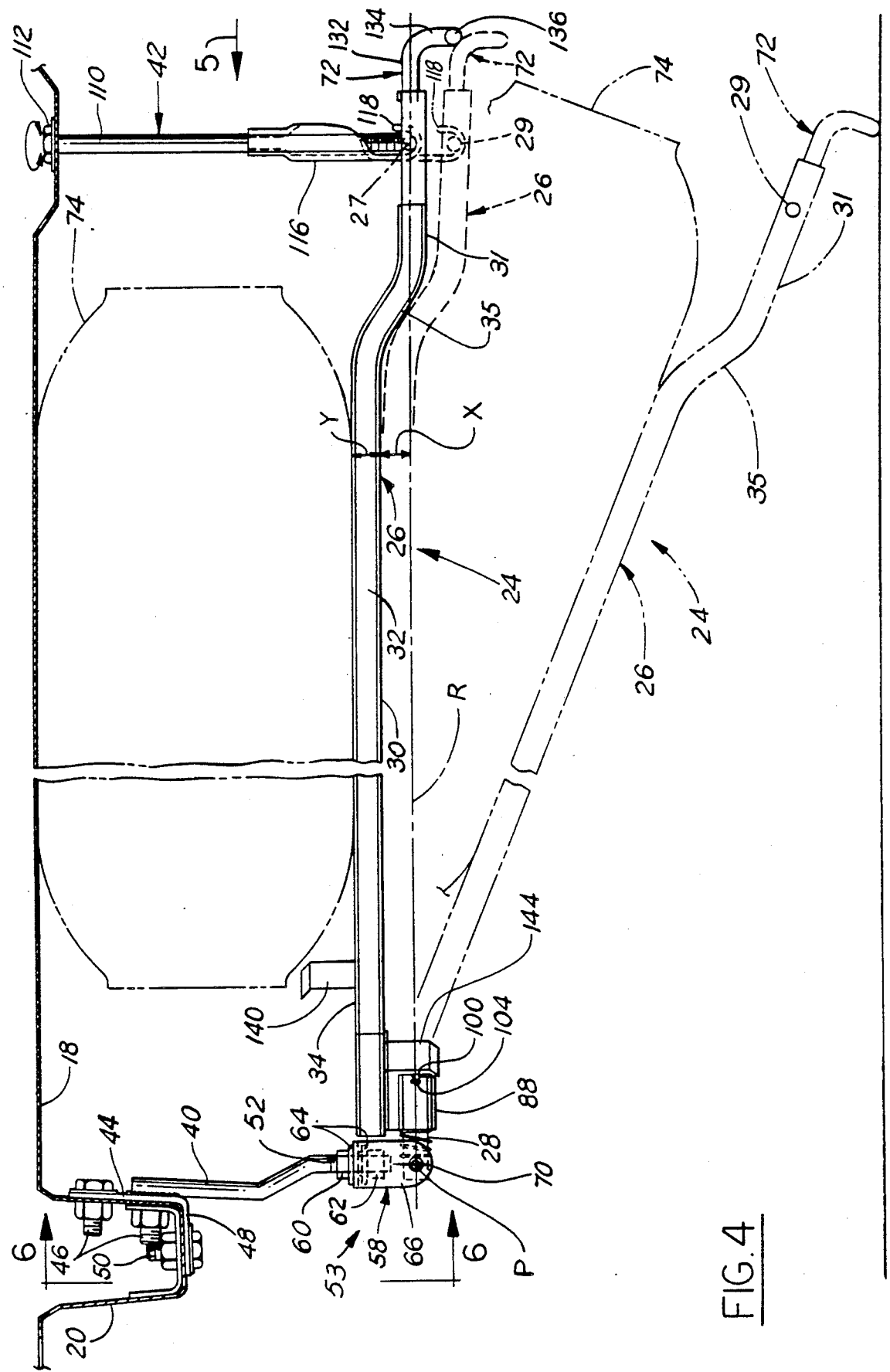
FIG. 4 is an enlarged fragmentary side elevational view of the spare tire carrier in its raised storage position housing a minimum thickness spare tire.

A spare tire carrier apparatus, generally indicated at 24 in FIGS. 1, 2, and 3, includes an elongated carrier member 26 of generally rectangular shape. As best seen in FIG. 4, the carrier member 26 is provided with a cylindrical pintle pin first end connector 28 adjacent one hinged end of the carrier member with its axis aligned on carrier member longitudinally extending rotational axis "R". The carrier member 26 is provided with a transversely extending keeper rod in the form of second end connector 29 adjacent the opposite other longitudinal end of the carrier member 26 with longitudinal rotational axis "R" shown intersecting transverse principal axis 27 of the keeper rod second end connector 29 at the midpoint thereof.

Figure 4A:
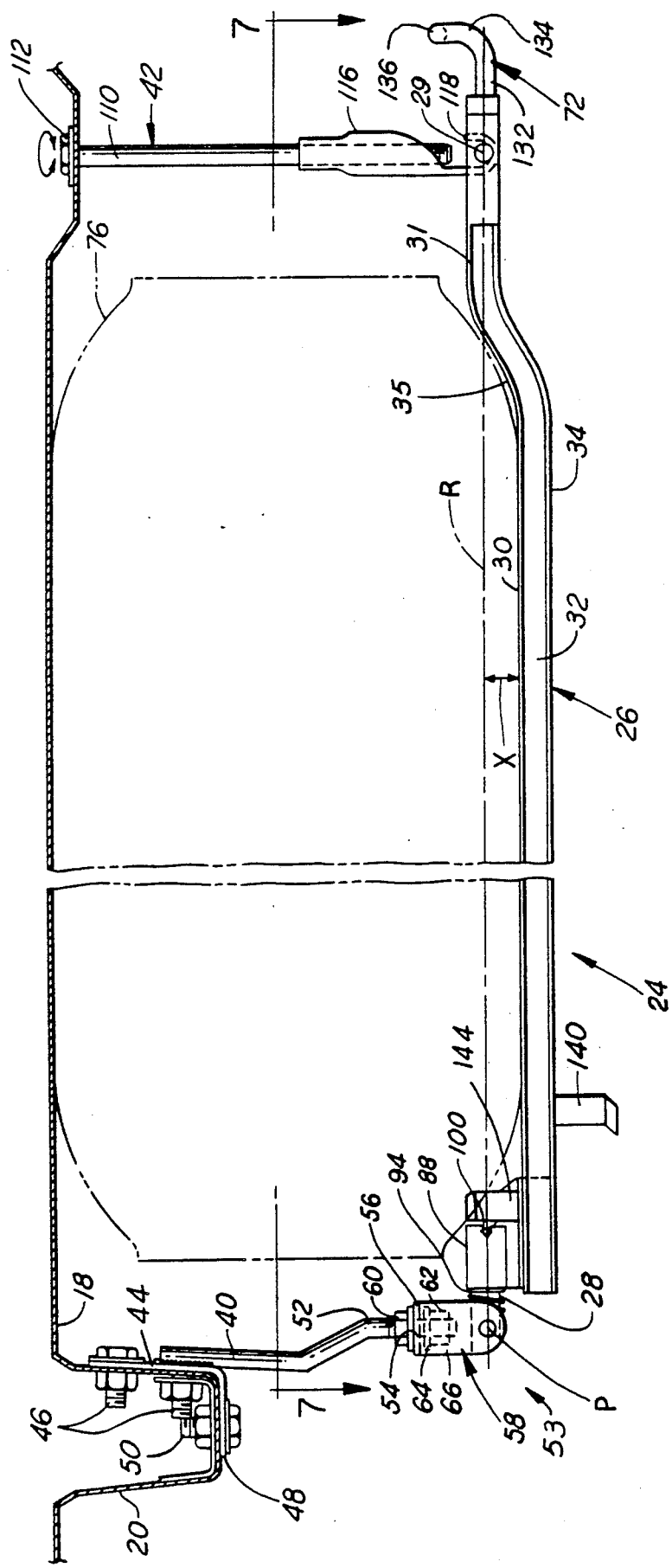
FIG. 4A is a view similar to FIG. 4 showing the spare tire carrier in its raised storage position housing a maximum thickness spare tire.

With reference to FIG. 4, the carrier member 26 is shown in the disclosed embodiment fabricated of a sheet metal panel, providing a maximum thickness spare tire support surface or area 30 and a parallel offset surface portion 31. The carrier member sheet panel is formed with upstanding side edge flanges 32 and a central longitudinally extending channel having a pair of vertical side walls 33 and a horizontal base wall defining a minimum thickness spare tire support surface or area 34. The edge flanges 32 and the central channel formed therein provide rigidity for the carrier member sheet metal panel. FIGS. 4, 4A, and 7 show the main panel 30 portion disposed parallel to and offset from the end panel portion 31 by transversely extending bent shoulder portion 35.

It will be understood that the carrier member 26 could be fabricated from alternative materials and structural members without departing from the teachings of the present invention. For example, a tubular rod frame construction, such as disclosed in the U.S. Pat. No. 4,384,815 issued May 24, 1983 to Suzuki et al., could be substituted for the sheet metal panel carrier member.

With reference to FIG. 4, it will be seen that the carrier member 26 is supported from the vehicle underside by a pair of vertically disposed hanging or holding rods in the form of a first hinged holding rod 40 and a second releasable and extensible holding rod 42. The first holding rod 40 has its upper end suitably secured, as by welding, to an angle bracket vertical flange 44. The angle bracket vertical flange 44 is secured by a pair of bolts 46 to the side wall of beam 10 while the angle bracket has a horizontal flange 48 secured by bolt 50 to the bight portion of the beam 20.

As best seen in FIG. 6, the first holding rod 40 includes a lower vertically disposed off-set clearance portion 52 the free end of which is suitably attached to a universal hinge assembly 53. In the disclosed form, the first holding rod free end extends through a hole 54 in horizontally disposed bight portion 56 of universal hinge assembly clevis member 58. Upper and lower nuts 60 and 62, respectively, together with associated washers 64 fixedly retain the clevis member 53 on the first holding rod free end. The clevis member 58 is formed with a pair of depending parallel legs 66 having aligned holes 68 therein receiving a horizontal pivot pin or bolt 70 therethrough and retained by nut 71. Principal pivot axis of the bolt 70 defines the horizontally disposed transversely extending pivot axis "P" of the universal hinge assembly 53 about which the carrier member 26 is adapted to pivot or swing.

As seen in FIGS. 4 and 4A, the carrier member 26 is adapted to swing downwardly abrut the pivot axis "P" from its horizontal raised position to a lowered inclined position, indicated by dashed phantom lines in FIG. 4. As viewed in FIG. 1, the carrier member 26 is adapted to have a steel rod-form 72 secured to its releasable end providing a support rest for engaging the ground wherein a minimum thickness spare tire 74 (FIG. 4) or a maximum thickness spare tire 76 (FIG. 4A) is adapted to be inserted or removed from the carrier member in a manner to be explained below.

With reference to FIGS. 6 and 8, the pivot bolt 70 is shown extending through a transverse bore 78 in the pintle pin end connector 28 of the universal hinge assembly 53. Thus, the carrier member longitudinal rotational axis "R" intersects the pivot axis "P" at right angles. The pintle pin end connector 28, transversely centered on the bolt 70 by a pair of spaced sleeves 84, has its inner end telescopically received in a cylindrical journal socket 86 having the center of curvature thereof aligned on the rotational axis "R". The pintle journal socket 86, which is part of the universal hinge assembly 53, is formed by a bridging convolute-shaped bracket strap 88 together with an inner half-round shell 90 (FIG. 6) welded thereto. The bracket strap 88 includes flange portions 92 welded to the upper surface of the carrier member main support panel portion 30.

As seen in FIGS. 8-10, compression coil biasing spring 94 surrounds an intermediate portion of the pintle pin first end connector 28 and is captured between the journal socket outboard edge 96 and the spacer sleeves 84. The journal socket has its inboard edge 98 formed with a pair of diametrically opposed longitudinally extending notches 100 defining a plane parallel to the support surface 30. The pair of notches 100 are adapted to receive and seat associated trunnions in the form of oppositely projecting free ends of a cross pin 104 (FIG. 7) extending transversely through the inboard end of the pintle pin end connector 28. The spring 94 is operative to normally bias the pair of locking notches 100 inboard into engagement with respective cross pin 104 trunnions releasably locking the pintle pin end connector 28 into one of its two 180 degree opposed rotative spare tire stowage modes.

As seen in FIG. 4, the second adjustable length holding rod 42 comprises a vertically disposed bolt 110 having an upper hex head 112 accessible from the upper surface of the floor pan 18 with the bolt 110 extending through an aligned hole in the floor pan 18. The bolt 110 is threadably received in an elongated tubular anchor 116 having its lower end formed with attaching means in the form of a releasable J-shaped hook 118. The hook 118 is adapted to capture the transverse keeper rod 29 which keeper rod has its end portions welded to one undersurface of the a necked-down area 122 of offset panel portion 31. It will be noted in FIG. 7 that the carrier member 26 is symmetrical about a longitudinally extending vertically disposed plane of symmetry that includes the rotational axis "R".

The offset neck area 122 has a rectangular aperture 124 therein, bridged by the keeper rod 29, allowing the hook portion 118 to be inserted therethrough. The hook portion 118 is adapted for engaging the keeper rod 29 upon the anchor 116 being threadably lowered on the bolt 110 to its dashed line position in FIG. 4.

As best seen in FIGS. 7 and 13, the carrier member offset neck area 122 has steel rod stock portion bent into the generally U-shaped rod-form 72 defining a pair of parallel rod lengths 132 having their free ends welded to the panel neck portion 122. The rod lengths 132 have their connected ends formed with right-angled intermediate lengths 134 joined by a transverse handle portion 136 adapted to be grasped by the operator while also providing a ground engaging rest.

With reference to FIG. 4, the carrier member panel main support portion 30 provides a surface area 34 adapted to support a minimum thickness spare tire 74. It will be noted that the plane of the maximum thickness spare tire support surface area 30 is stepped upwardly a predetermined dimension "X" from a horizontally disposed reference plane which includes the carrier member rotational axis "R". In the invention's minimum thickness spare tire stowage mode of FIG. 4, with the main panel surface 30 disposed parallel to the floor pan 18, it will be noted that the rotational axis "R" of the longitudinal pintle 28 passes through the transverse principal axis 27 of the keeper rod 29.

It will be observed in FIGS. 4 and 7 that the sheet metal panel main support surface area 30 has a pair of symmetrically disposed right angle locating flanges 140 pierced from associated panel rectangular apertures 142. The locating flanges 140 are adapted to position a minimum thickness spare tire 74, having a minimum radius, on the support surface area 34 as seen in FIG. 4. In a similar manner, a pair of symmetrically disposed right angle locating flanges 144 are bent from end edge portions of the sheet metal panel main support portion 30 and are adapted to position a maximum thickness spare tire 76 having a maximum radius.

FIG. 4A depicts the spare tire carrier assembly revolved to its maximum thickness spare tire stowage mode wherein the plane of the main panel surface 30 is stepped downwardly a predetermined dimension "X" from the horizontal reference plane which includes the rotational axis "R". As a result, with the carrier member revolved to its maximum thickness tire stowage mole, the main panel surface 30 defines a maximum thickness tire support area allowing the stowage of tire 76. It will be noted that maximum thickness tire 76 has an increased thickness dimension relative to minimum thickness tire 71 equal to twice the offset dimension "X", plus differential dimension "Y" with dimension "Y" being equal to the carrier member thickness.

In the operation of the spare tire carrier arrangement, assume a minimum thickness spare tire 74 is stored in the carrier member upwardly facing surface area 34 as shown in FIGS. 1 and 4. The universal hinge assembly 53, as seen in FIG. 8, has the free trunnion ends of its pintle pin end connector cross pin 104 in releasably locked engagement with an associated one of the pair of diametrically opposed locking notches 100. This locking engagement is achieved by compression coil spring 94 slidably biasing the carrier member journal socket 88 inboard on the pintle pine end connector 28 to its FIG. 8 location. FIGS. 8 and 11 show the surface area 34 is horizontally positioned above the rotational axis "R". The user rotates the hex head 112 of the bolt 110 causing the tubular anchor 116 of the second holding rod to be threadably lowered on the bolt 110 to its dashed line position in FIG. 4. This enables the operator to grasp the handle 136 and slightly elevate the carrier member 26 about the pivot axis "P". As a result, the anchor J-shaped hook attaching means 118 is released from the keeper rod 29 by swinging the second holding rod 42 toward the first holding rod 40.

With the keeper rod 29 released from the J-shaped hook attaching means 118, the carrier member 26 is lowered until it rests on the ground, as seen in its phantom-line position of FIG. 4. The minimum thickness spare tire 74 is then removed from the carrier member 26 for the purpose of replacing it with the maximum thickness tire 76 in FIG. 4A. Upon the carrier member 26 being freed of the tire 74, the operator pivots the carrier member upwardly to an intermediate raised position and pushes longitudinally on the handle 136. This causes the carrier member 26 to move axially relative to the pintle pin 28 whereby the compression coil spring 94 is depressed to its FIG. 9 position. With the coil spring 94 in its FIG. 9 depressed position, the cross pin 104 trunnion free ends are disengaged from their associated locking notches 100. As a result, the operator, by continuing to push on the handle 136, maintains the disengagement of the cross pin free ends. This enables the operator to revolve the carrier member 26 on the pintle pin 28 about its second rotational axis "R" as seen in FIG. 12. FIGS. 11 - 13 show a sequence wherein the carrier member 26 is rotated clockwise from its first minimum thickness tire mode of FIG. 11 through a partially rotated FIG. 12 position to its second maximum thickness tire mode of FIG. 13. It will be noted that in the FIG. 11 first mode, the minimum thickness tire support area 34 is horizontally disposed above the axis "R" while in the FIG. 13 second mode the maximum thickness tire support area 30 is disposed below the axis "R".

While there has been shown and described in detail only one embodiment in accordance with the present invention, it is understood that the same is not limited thereto but is susceptible of numerous changes and modifications as known to those skilled in the art, and therefore it is not intended that the invention be limited to the details shown and described herein but the intention is to cover all such changes and modifications as are encompassed by the scope of the appended claims.

What is claimed is:

1. A spare tire carrier arrangement for stowing spare tires of different thickness generally horizontally under vehicle floor panel means comprising, in combination:

an elongated carrier member symmetrically disposed about a longitudinally extending vertically disposed plane of symmetry, said carrier member providing a planar main tire support portion defining parallel, oppositely facing maximum thickness and minimum thickness spare tire support areas on respective sides thereof, said carrier member having first and second end connector means adjacent respective first and second longitudinal ends thereof with each said first and second end connector means offset a predetermined dimension from said minimum thickness spare tire support area;

a first holding rod depending from the vehicle floor panel means and attached at a lower end thereof to said first end connector means, a second adjustable length holding rod depending from the vehicle floor panel means and having releasable attaching means at a lower end thereof attached to said second end connector means;

said first end connector means comprises a universal hinge assembly providing a first pivot axis enabling said carrier member to be swung from a substantially horizontal tire stowage position to a downwardly angled spare tire loading and unloading position;

said second end connector means comprises a second end keeper rod having a transverse principal axis thereof oriented horizontally;

said universal hinge assembly further providing a second longitudinally disposed rotational axis extending in said plane of symmetry with said second rotational axis intersecting both said first pivot axis and said keeper rod principal axis;

said universal hinge assembly incorporating releasably engaging locking means which upon disengagement allowing said carrier member to be revolved about said second rotational axis, and which upon engagement of said locking means adapted to lock said carrier member in either a first minimum thickness tire stowage mode, wherein said minimum thickness spare tire support area is horizontally positioned above said second rotational axis, or a second maximum thickness spare tire support mode wherein said maximum thickness spare tire support area is horizontally positioned below said second rotational axis;

whereby upon said adjustable length holding rod lower end attaching means being released from said second end keeper rod and said universal hinge assembly locking means being disengaged, said universal hinge assembly enabling said carrier member to be lowered about said first pivot axis to an inclined position and rotated about said second rotational axis to either of said first and second spare tire storage modes and thereafter said locking means being engaged; and subsequently said carrier member being raised and said second holding rod attaching means being re-attached to said second end keeper rod such that the spare tire support area of a selected one of said spare tire first and second storage modes being positioned in opposed vertically spaced substantially parallel relation to said floor panel means.

2. A spare tire carrier arrangement as set forth in claim 1, wherein said universal hinge assembly further comprises a clevis supported on the lower end of said first holding rod, said clevis formed with a pair of depending legs having aligned holes receiving a pivot pin therethrough with a principal axis thereof defining said first pivot axis.

3. A spare tire carrier arrangement as set forth in claim 2, wherein said universal hinge assembly further comprises a pintle pin having an outboard end thereof formed with a transverse bore receiving said pivot pin therethrough such that said pintle pin is pivotally supported intermediate said pair of clevis depending legs, said pintle pin having an inboard end thereof telescopically received in a cylindrical journal socket formed on said carrier member first longitudinal end, said cylindrical journal socket having inboard and outboard edges and said pivot pin principal longitudinal axis coinciding with said second rotational axis; and said releasably engaging locking means operative when disengaged allowing said cylindrical journal socket to be revolved about said pintle pin and said releasably engaging locking means operative when engaged preventing relative rotational movement between said cylindrical journal socket and said pintle pin.

4. A spare tire carrier arrangement as set forth in claim 3, wherein said universal hinge assembly releasably engaging locking means comprises a pair of diametrically opposed longitudinally extending notches formed on said cylindrical journal socket one inboard edge thereof, said pintle pin inboard end having a pair of diametrically opposed transversely extending trunnions, each said trunnion adapted to be releasably engaged in an associated notch by compression spring means operative between said pintle pin and said journal socket to longitudinally bias each said trunnion into an associated notch thereof; and whereby upon said carrier member second end connector means being released from said second holding rod lower end attaching means enabling an operator, upon manually grasping and longitudinally pushing said carrier member second end, to overcome said compression spring means bias and disengage said pintle pin pair of trunnions from an associated notch thereof, such that with each said trunnion removed from an associated one of said notches enabling the operator to revolve said carrier member about said second rotational axis substantially 180 degrees wherein, upon the operator releasing said carrier member second end, said compression spring means operative to bias each said trunnion into engagement with an associated one of said notches.

5. The spare tire carrier arrangement as set forth in claim 4, wherein handle means located on said carrier member second end enabling the operator to readily raise and lower said carrier member about said first pivot axis and revolve said carrier member about said second rotational axis.

6. The spare tire carrier member as set forth in claim 5, wherein said handle means is adapted to support said carrier member on the ground upon said carrier member being pivoted downwardly to an inclined tire loading and unloading position thereof.

7. The spare tire carrier member as set forth in claim 1, wherein said second adjustable length holding rod attaching means comprises a J-shaped hook adapted for releasably engaging said keeper rod.

8. The spare tire carrier member as set forth in claim 7, wherein said second adjustable length holding rod comprises a vertically disposed bolt having an upper head accessible by the operator from an upper surface thereof of said floor panel means, said bolt having a threaded shank extending through a hole in said floor panel means and threadably received in an elongated tubular anchor, said anchor having a lower end thereof formed with said J-shaped hook enabling said J-shaped hook to be raised and lowered relative to said threaded shank for respective attachment and release said keeper rod.

* * * * *